(No Model.)
J. L. HOLTON & L. H. BRITTON.
HOSE COUPLING.
No. 397,187. Patented Feb. 5, 1889.
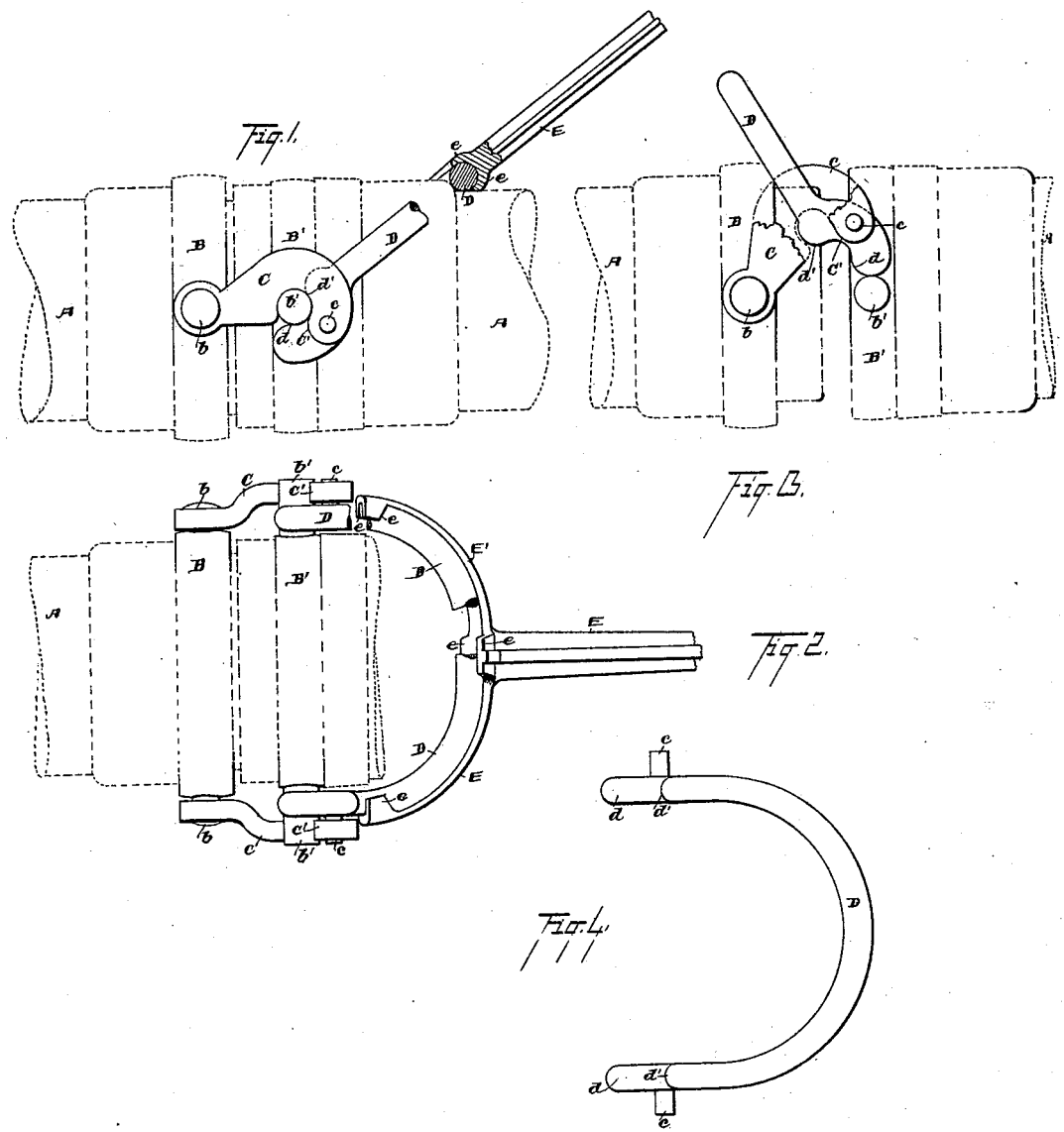
WITNESSES:
N. S. Amstutz
Geo. W. King
INVENTORS,
John L. Holton,
Louis H. Britton
BY Liggett & Liggett
ATTORNEYS,

UNITED STATES PATENT OFFICE.

JOHN L. HOLTON AND LOUIS H. BRITTON, OF NEW LISBON, OHIO.

HOSE-COUPLING.

SPECIFICATION forming part of Letters Patent No. 397,187, dated February 5, 1889.

Application filed September 29, 1888. Serial No. 286,757. (No model.)

*To all whom it may concern:*

Be it known that we, JOHN L. HOLTON and LOUIS H. BRITTON, of New Lisbon, in the county of Columbiana and State of Ohio, have invented certain new and useful Improve-provements in Hose-Couplings; and we do hereby declare the following to be a full, clear, and exact description of the invention, such as will enable others skilled in the art to which it pertains to make and use the same.

Our invention relates to improvements in hose-coupling; and it consists in certain features of construction and in combination of parts hereinafter described, and pointed out in the claims.

In the accompanying drawings, Figure 1 is a side elevation, and Fig. 2 is a corresponding plan showing the coupling locked or coupled. Fig. 3 is a side elevation showing the coupling uncoupled. Fig. 4 is a detail of the bail.

A A are the lengths of hose that are to be coupled, and B and B' are metal bands secured in the usual manner to the hose, the band B being provided with lateral trunnions $b$, and the band B' having lateral lugs or pins $b'$. Opposing bands B and B' abut an intervening rubber gasket, (not shown,) by the compression of which gasket a tight joint is made at the coupling. On trunnions $b$ are mounted, respectively, hooks C, and these hooks at $c$ are pivoted to the respective legs of a bail in common, D. When the bail is turned back—that is, to the left hand—and the hooks and bail are in the position shown in Fig. 3, by pressing the two members of the coupling together by hand the seats or short arms $d$ of the bail will pass by lugs $b'$, whereupon by turning the bail forward to the position shown in Figs. 1 and 2 the two members of the coupling are drawn together with great force, and the points C' of hooks C are drawn down to an engagement with lugs $b'$, as shown in Fig. 1, in which position of parts the two members of the coupling are held locked, and the aforesaid intervening gasket is supposed to have been compressed sufficiently to make a tight joint. In reversing the bail to unlock, the coupling-seats $d'$ of the bail engage lugs $b'$, by means of which the hooks are drawn off from lugs $b'$, and the coupling is detached. The bail in the locked position of parts shown in Fig. 1 fits snugly over the top of the hose. The bail, therefore, is not cumbersome and is of little weight. The bail when thus reduced to the desired proportions does not furnish sufficient leverage for conveniently manipulating the bail by hand, although it may be done. I therefore provide an extension-lever, E, the same having prongs E', such prongs being adapted to fit the periphery of the bail, the prongs being provided with lugs $e$, set in pairs and adapted to embrace the bail. The extension-lever, therefore, may be slipped endwise onto the bail, and may be removed by reversing such end movement. Lever E is usually a foot (more or less) in length, and thus gives ample leverage for easily manipulating the bail by hand, and the extension-lever when not in use may of course be laid aside. As the extension-lever is only supposed to be in the hands of parties whose business it is to handle the hose and coupling, other parties not having such extension-lever cannot well couple or uncouple the hose. One of the great advantages of this coupling is the dispatch with which it can be operated, it requiring not usually more than one or two seconds to couple or uncouple the device. The device is strong, simple, and inexpensive, and the ordinary wear and tear thereof are merely nominal, and with ordinary usage such coupling should last a life-time.

It will be understood that one member of the coupling may be connected with, for instance, a fire-plug, nozzle, engine, or whatever it may be necessary or desirable to attach the length of hose.

We do not wish to limit ourselves to coupling hose simply, as substantially the same mechanism may be employed for securing, for instance, caps to fire-plugs and for various other analogous uses where dispatch in the manipulation of the coupling is of importance; and we claim, therefore, our device for all purposes for which it is adapted.

What we claim is—

1. The combination, with two opposing members of the coupling, hooks pivoted to the one member, the free end of the hooks being adapted to engage fastenings on the other member of the coupling, of a bail pivoted to the free end of such hooks and provided with hooked ends, which latter project beyond the free ends of the hooks for drawing the hook onto and off of such fastenings, substantially as set forth.

2. The combination, with hooks and fasteners for engaging the free end of the hooks in holding the coupling together, substantially as indicated, of a bail pivoted to the free end of such hooks, such bail having seats on either side of the fulcrum thereof for respectively engaging the hook-fasteners with the reverse movements of the bail, substantially as set forth.

3. The combination, with coupling, hook, and bail, substantially as indicated, of a lever having a forked end adapted to engage the periphery of the bail, the prongs of the lever having inwardly-projecting lugs set in pairs to embrace laterally the wire or body of the bail, substantially as set forth.

In testimony whereof we sign this specification, in the presence of two witnesses, this 16th day of April, 1888.

JOHN L. HOLTON.
LOUIS H. BRITTON.

Witnesses:
CONRAD HUNE,
GRANT S. WHITSLOR.